(12) United States Patent
Ramesh et al.

(10) Patent No.: US 6,881,791 B2
(45) Date of Patent: *Apr. 19, 2005

(54) POLY-ELECTROLYTE FREE BLOCK COPOLYMERS AND THEIR USE IN CROSSLINKING COATINGS APPLICATIONS

(75) Inventors: Swaminathan Ramesh, Canton, MI (US); Paul Harris, West Bloomfield, MI (US); Wolfgang Bremser, Münster (DE); Walter H. Ohrbom, Hartland Township, MI (US)

(73) Assignee: BASF Corporation, Southfield, MI (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/455,066

(22) Filed: Jun. 5, 2003

(65) Prior Publication Data

US 2003/0229173 A1 Dec. 11, 2003

Related U.S. Application Data

(63) Continuation-in-part of application No. 09/930,615, filed on Aug. 14, 2001, and a continuation-in-part of application No. 09/747,473, filed on Dec. 22, 2000, now Pat. No. 6,699,943, and a continuation-in-part of application No. 09/747,475, filed on Dec. 22, 2000, now Pat. No. 6,403,709.

(30) Foreign Application Priority Data

Jun. 16, 2000 (DE) .......................... 100 29 803

(51) Int. Cl.[7] .............................. C08F 8/00; C08L 53/00; C08J 3/26
(52) U.S. Cl. ..................... 525/191; 525/192; 525/193; 525/194; 525/96; 525/98; 524/599; 524/606; 524/608
(58) Field of Search ............................... 525/191, 192, 525/193, 194, 96, 98; 524/599, 606, 608

(56) References Cited

U.S. PATENT DOCUMENTS

| | | | |
|---|---|---|---|
| 5,356,669 A | 10/1994 | Rehfuss et al. | |
| 5,552,497 A | 9/1996 | Taylor et al. | |
| 5,567,527 A | 10/1996 | Webster et al. | |
| 5,684,078 A | 11/1997 | Pfaffenschlager et al. | |
| 5,756,213 A | 5/1998 | Ohrbom et al. | |
| 5,786,402 A | 7/1998 | Bruchmann et al. | |
| 5,827,931 A | 10/1998 | Menovcik et al. | |
| 5,854,385 A | 12/1998 | McGee et al. | |
| 5,856,382 A | 1/1999 | Ohrbom et al. | |
| 5,989,642 A | 11/1999 | Singer et al. | ............ 427/407.1 |
| 6,040,062 A | 3/2000 | McGee et al. | |
| 6,045,872 A | 4/2000 | Harmon et al. | |
| 6,060,556 A | 5/2000 | Collins et al. | |
| 6,150,465 A | 11/2000 | Harris et al. | |
| 6,346,591 B1 | 2/2002 | Ohrbom et al. | ............. 526/312 |
| 6,403,709 B1 * | 6/2002 | Ramesh et al. | ............... 525/95 |
| 6,566,476 B1 | 5/2003 | Ohrbom et al. | ............. 526/312 |
| 2002/0035289 A1 | 3/2002 | Walter et al. | ............... 560/157 |
| 2002/0086966 A1 | 7/2002 | Weise et al. | ................. 526/312 |
| 2002/0103319 A1 | 8/2002 | Ohrbom et al. | ............. 526/312 |
| 2002/0132921 A1 * | 9/2002 | Ramesh et al. | ............... 525/88 |

FOREIGN PATENT DOCUMENTS

| | | |
|---|---|---|
| EP | 0 755 946 | 7/1996 |
| EP | 0 761 695 | 8/1996 |
| EP | 0 899 103 | 8/1998 |
| WO | WO 99/62978 | 12/1999 |

OTHER PUBLICATIONS

Ramesh, et al, 09/747,473 filed on Dec. 22, 2000, entitled Water–based coating composition having carbamate–melamine cross–linking, method of preparing the same and a cured film thereof, pp. 1–44, and the abstract.
Ohrbom, et al, 10/002,807 filed on Nov. 2, 2001, entitled Water–and organic–soluble carbamate Material, pp. 1–16.

* cited by examiner

*Primary Examiner*—James J. Seidleck
*Assistant Examiner*—Olga Asinovsky

(57) ABSTRACT

A curable, water-based coating composition comprising a reaction product of: a copolymer comprising a free-radical polymerization product of: a first block comprising a reaction product of: a plurality of ethylenically unsaturated monomers, and a vinyl aromatic hydrocarbon monomer, wherein at least one monomer of the plurality of ethylenically unsaturated monomers includes a functional group that can react with a water-dispersible cross-linking agent, and at least one monomer of the plurality of ethylenically unsaturated monomers is present in an amount such that it can render the copolymer water dispersible, and a second block comprising a reaction product of at least one ethylenically unsaturated monomer, wherein at least a portion of which are non-functional, and a water-dispersible cross-linking agent, wherein the water-based copolymer is free of salt structures.

43 Claims, No Drawings

POLY-ELECTROLYTE FREE BLOCK COPOLYMERS AND THEIR USE IN CROSSLINKING COATINGS APPLICATIONS

CROSS-REFERENCE TO RELATED APPLICATIONS

The present application is a Continuation-In-Part of U.S. patent application Ser. Nos.:

I. 09/747,473, filed on Dec. 22, 2000, now U.S. Pat. No. 6,699,943 which claims priority to German Application No. DE 100 29 803.6, filed on Jun. 16, 2000; and II. 09/930,615, filed on Aug. 14, 2001, which is a Continuation-In-Part of U.S. patent application Ser. Nos.:
  i. 09/747,473, filed on Dec. 22, 2000, now U.S. Pat. No. 6,699,943 which claims priority to German Application No. DE 100 29 803.6, filed on Jun. 16, 2000, and
  ii. 09/747,475, filed on Dec. 22, 2000, now U.S. Pat. No. 6,403,709, which claims priority to German Application No. DE 100 29 803.6, filed on Jun. 16, 2000, all of the preceding applications are incorporated herein by reference.

BACKGROUND OF THE INVENTION

Water-based coating compositions include water-based copolymers and cross-linking agents as components. The water-based copolymers are desirable for use in coating systems in the automotive and industrial coatings industries because these copolymers enable formulation of waterborne coating systems, such as WBBC, WBCC, and waterborne primer systems. It is known in the art that waterborne coating systems are ideal as compared to solventborne coating systems because waterborne coating systems have lower content of volatile organic compounds (VOCs).

The water-based copolymers of the prior art have proven to be inadequate for use as a component in water-based coating compositions. The water-based copolymers of the prior art are ineffective because these copolymers are highly viscous, as secondary dispersions, and generally have poorly defined film forming characteristics, as primary dispersions. Furthermore, the cross-linking between the copolymers of the prior art and conventional cross-linking agents, such as aminoplasts, are often particularly susceptible to poor chip performance and environmental acid etch.

The water-based copolymers of the prior art are also deficient because these copolymers often incorporate additional components such as co-solvents and surfactants which are both undesirable components in waterborne coating systems. For instance, conventional water-based copolymers typically incorporate a co-solvent to promote dispersibility of the copolymer in water, and these co-solvents contribute to increased VOCs. Conventional water-based copolymers also typically incorporate surfactants into the copolymer to promote and maintain miscibility and incorporation of the copolymer in water, and as understood by those skilled in the art, the incorporation of surfactants into coating compositions frequently contributes to water sensitivity, humidity, and 'cratering' as well as other coating defects detrimental to the appearance of the waterborne coating system.

The free-radical polymerization methods of preparing the water-based copolymers of the prior art are also deficient. These conventional methods are typically highly exothermic and are therefore difficult to predict and control. The unpredictability of these methods leads to uncontrollable and inconsistent physical properties of the water-based copolymer and ultimately of the water-based coating composition which includes the copolymer as a component. More specifically, the unpredictability of these methods frequently leads to inconsistent molecular weight distribution of the copolymer, and to incomplete conversion of monomer components into the copolymer. Furthermore, in the preparation of conventional water-based copolymers, distribution of the monomer components is random and does not produce a 'tailored' polymeric architecture that is able to meet particular needs depending on whether the copolymer is utilized in a WBBC, WBCC, or waterborne primer system. It is understood in the art that inconsistent molecular weights, incomplete conversion of monomer components, and even random distribution of the monomer components affects, among other things, the stability of the viscosity of the copolymer and can even result in 'gelling' of the copolymer and of the water-based coating composition. Additionally, poor appearance characteristics of the WBBC, WBCC, or waterborne primer system, such as gloss and distinctness of image (DOI), can result from poor rheology, i.e., flow, of the coating composition upon application that is due to the inconsistencies in the water-based copolymer.

In sum, the prior art water-based copolymers which are components of the water-based coating composition, as detailed above, are characterized by one or more inadequacies. Due to the inadequacies identified in the prior art, it is desirable to provide a novel water-based copolymer and coating composition to be utilized in WBBC, WBCC, and waterborne primer systems as well as a novel method of preparing the coating composition and a cured film.

SUMMARY OF THE INVENTION

The present invention relates to a curable, water-based coating composition comprising a reaction product of:

A. a copolymer comprising a free-radical polymerization product of:
  i. a first block comprising a reaction product of:
    a. a plurality of ethylenically unsaturated monomers, and
    b. a vinyl aromatic hydrocarbon monomer, wherein at least one monomer of the plurality of ethylenically unsaturated monomers includes at least one functional group that can react with a water-dispersible cross-linking agent, and at least one monomer of the plurality of ethylenically unsaturated monomers is present in an amount such that it can render the copolymer water dispersible, and
  ii. a second block comprising a reaction product of at least one ethylenically unsaturated monomer, wherein at least a portion of which are non-functional, and
B. a water-dispersible cross-linking agent, and wherein the copolymer is free of salt structures.

DETAILED DESCRIPTION OF THE INVENTION

As used throughout, ranges are used as a shorthand for describing each and every value that is within the range. Any value within the range can be selected as the terminus of the range.

The curable, water-based coating composition of the subject invention is utilized in waterborne coating systems. Waterborne coating systems, such as waterborne basecoat (WBBC) systems and waterborne clearcoat (WBCC) systems, are used throughout automotive, industrial, and other coatings industries to coat various substrates for aesthetic and functional purposes, such as color and environmental resistance, respectively. Although the subject invention is directed at WBBC and WBCC systems, it is to be understood that the subject invention may also be utilized in other waterborne coating systems including, but not limited to waterborne primer systems, and in other industries including, but not limited to, the adhesive and sealant industries.

The water-based coating composition of the subject invention includes the reaction product of a water-dispersible cross-linking agent and a water-based copolymer including a functional group suitable for reaction with the cross-linking agent. As will be described further below, in one illustration, the functional group of the copolymer reacts with the cross-linking agent to establish urethane (—NH—CO—O—) cross-linking without use of an isocyanate. The water-based coating composition is prepared by a free-radical polymerization method. In general, the method of preparing the coating composition includes the steps of forming a first block including the functional group, polymerizing a second block, including at least one ethylenically unsaturated monomer, at least a portion of which are non-functional, with the first block to establish the water-based copolymer, and combining the water-based copolymer with a water-dispersible cross-linking linking agent such that the functional group of the copolymer reacts with the cross-linking agent to prepare the water-based coating composition of the subject invention. These method steps will be discussed in greater detail below.

The water-based copolymer is the reaction product of the first block and the second block. In the most preferred embodiment, the first block is a hydrophilic block, and the second block is a hydrophobic block, and the subject invention will be described with this in mind. However, it is to be understood that the number of blocks is not intended to be limiting. For instance, the water-based copolymer could also be the reaction product of three blocks, a first block, a second block, and a third block. As a non-limiting example, the first block could be a hydrophilic block, the second block a hydrophobic block, and the third block a hydrophilic block. The subject invention may also be understood in terms of functional and non-functional blocks. As such, the first block could be a functional block, the second block a non-functional block, and the third block a functional block. In the most preferred embodiment, the first block, which is hydrophilic, is functional, and the second block, which is hydrophobic, is non-functional. Furthermore, it is conjectured that the functional block, which, as indicated above, participates in the cross-linking reaction with the cross-linking agent, is the component of the water-based composition that actually binds to the substrate or to a coating already on the substrate. It is also conjectured that the non-functional block separates from the functional block, i.e., extends outwardly from the functional block away from the substrate, to establish a cushion-like effect. This effect is established because, as will be described below, the non-functional block has a high weight-average molecular weight relative to the functional block, and it is therefore more able to resist chip and adhesion defects. It is possible to have situations where all the blocks have functionalities, same or different, to meet the needs of a particular situation.

The first block is present in an amount from 5 to 15, preferably from 7 to 10, parts by weight based on 100 parts by weight of the coating composition. The first block is the reaction product of a plurality of ethylenically unsaturated monomers, a vinylaromatic hydrocarbon monomer, and an ethylenically unsaturated monomer that can impart water dispensability to the polymer. At least one monomer of the plurality of monomers in the first block includes the functional group that is suitable for reaction with the cross-linking agent. To form the first block, the plurality of ethylenically unsaturated monomers and the vinylaromatic hydrocarbon monomer, are polymerized. This polymerization step is conducted over time from 1 to 8, preferably from 2 to 7, and most preferably from 4 to 6, hours, and at a temperature between 50° C. and 100° C. It is to be understood that the time required to conduct this 'polymerization step' includes the time needed for the addition of monomer components as well as any holding or cooling time, where the addition of monomers may not be occurring. It is also to be understood that certain ethylenically unsaturated monomers and certain vinylaromatic hydrocarbon monomers require that the polymerization step be conducted under pressure. If required, such pressure is preferably from 1.5 to 3000 bar, and more preferably from 10 to 1000 bar.

The plurality of ethylenically unsaturated monomers in the first block can introduce the functional group that is suitable for reaction with the cross-linking agent, and the plurality of ethylenically unsaturated monomers may also be selected to achieve an ideal minimum film forming temperature, MFFT, for the water-based copolymer, and ultimately for a cured film of the water-based coating composition utilized in either the WBBC, WBCC, or waterborne primer system, such that the cured film is resistant to excessive cracking, chipping, and the like. The plurality of ethylenically unsaturated monomers may also be selected to minimize the photo-sensitivity of the coating composition and of the cured film formed of the coating composition.

In an embodiment of the subject invention, the plurality of ethylenically unsaturated monomers includes a first, second, and third ethylenically unsaturated monomer. However, it is to be understood that the plurality of ethylenically unsaturated monomers may include more than three monomers without varying the scope of the subject invention. The first, second, and third ethylenically unsaturated monomers are selected in order to balance the desired physical characteristics as discussed above. That is, the first, second, and third ethylenically unsaturated monomers are selected to balance the solubility of the copolymer in water as well as the MFFT and the photosensitivity of the coating composition and of the cured film. Additionally, the second ethylenically unsaturated monomer introduces a functional group that is suitable for reaction with said cross-linking agent. In terms of the total monomer composition in the first block of the copolymer, the first, second, and third ethylenically unsaturated monomers form from 70 to 99, preferably from 92 to 98, parts by weight based on 100 parts by weight of total monomer composition in the first block. It is to be understood that, in addition to the content of the first, second, and third ethylenically unsaturated monomers, the total monomer composition in the first block also includes the content of the vinylaromatic hydrocarbon monomer. As will be discussed in greater detail below, in certain embodiments, the vinylaromatic hydrocarbon monomer is alternatively defined as at least one ethylenically unsaturated monomer that is different than the plurality, i.e., that is different than the ethylenically unsaturated monomers included in the plurality, and of the general formula $R_1R_2C=CR_3R_4$. In such embodiments, the total monomer composition in the first block is defined to include the content of the at least one ethylenically unsaturated monomer of the general formula $R_1R_2C=CR_3R_4$. In the preferred embodiment, the weight ratio of the first ethylenically unsaturated monomer to the second ethylenically unsaturated monomer in the first block is from 1:0.5 to 1:5, and the weight ratio of the first ethylenically unsaturated monomer to the third ethylenically unsaturated monomer in the first block is from 1:0.5 to 1:5.

The first ethylenically unsaturated monomer of the plurality varies depending on the embodiment. More specifically, the functional group introduced in the plurality by the first ethylenically unsaturated monomer can vary. The monomer or monomers that are selected for the first ethylenically unsaturated monomer depend on the functional group that is suitable for reaction with the cross-linking agent. Preferred embodiments of the subject invention include carbonate functional groups, carbamate functional groups, hydroxyl functional groups, and mixtures thereof, and in a further preferred embodiment of the subject invention, the first ethylenically unsaturated monomer can include a carbamate functional group modified from an original carbonate functional group.

If the functional group of the first ethylenically unsaturated monomer is a carbonate functional group, then the first ethylenically unsaturated monomer is selected from the group consisting of cycloaliphatic acrylates, cycloaliphatic methacrylates, and mixtures thereof. In the context of the subject invention, cycloaliphatic compounds, such as the cycloaliphatic acrylates and cycloaliphatic methacrylates, are intended to include alicyclic compounds. It is to be understood that each of the cycloaliphatic acrylate and methacrylate compounds include an alkyl radical, and in the preferred embodiment of the subject invention, each of these compounds include up to 20 carbon atoms in the alkyl radical. In this embodiment, the first ethylenically unsaturated monomer is more preferably selected from the group consisting of carbonate-modified glycidyl acrylate, carbonate-modified glycidyl methacrylate, and mixtures thereof. As understood by those skilled in the art, carbonate-modified glycidyl acrylate is a cycloaliphatic acrylate, and carbonate-modified glycidyl methacrylate is a cycloaliphatic methacrylate. As also understood by those skilled in the art, the carbonate-modified glycidyl acrylate is formed by the reaction of glycidyl acrylate, having the chemical formula of $CH_2\text{:}CHCOOCH_2\underline{CHCH_2O}$, with $CO_2$, under excessive pressure and temperature conditions. Similarly, the carbonate-modified glycidyl methacrylate is formed by the reaction of glycidyl methacrylate, having the chemical formula of $CH_2\text{:}C(CH_3)COOCH_2\underline{CHCH_2O}$, with $CO_2$, under excessive pressure and temperature conditions. In the most preferred embodiment where the functional group of the first ethylenically unsaturated monomer is the carbonate functional group, the first ethylenically unsaturated monomer is carbonate-modified glycidyl methacrylate. For descriptive purposes, the accepted chemical abstract chemical name for carbonate-modified glycidyl methacrylate is 2-propenoic acid, 2-methyl-, (2-oxo-1,3-dioxalan-4-yl) methyl ester.

It is to be understood that the first ethylenically unsaturated monomer of the first block may introduce more than one carbonate functional group. It is also to be understood that alternative carbonate-modified compounds can be introduced by other chemical compounds such as epoxy group containing compounds reacted with $CO_2$, and even by chemical compounds having unsaturated bonds that are first converted to an epoxy group by known reactions with peroxides.

In a further embodiment of the subject invention, the functional group of the first ethylenically unsaturated monomer may be a carbamate functional group. As described above, the carbonate functional group is modified into the carbamate functional group. Any carbonate group is modifiable into a carbamate functional group. More specifically, the water-based coating composition according to the subject invention further includes the reaction product of an ammonia-containing compound. The ammonia-containing compound is reactive with the monomer of the plurality in order to modify the carbonate functional group into the carbamate functional group. The ammonia-containing compound is selected from the group consisting of ammonia, ammonium hydroxide, and mixtures thereof. Because the functional group is originally a carbonate functional group, the first ethylenically unsaturated monomer is selected from the same group as above. That is, the first ethylenically unsaturated monomer is selected from the group consisting of cycloaliphatic acrylates, cycloaliphatic methacrylates, and mixtures thereof. It is to be understood that each of the cycloaliphatic acrylate and methacrylate compounds include an alkyl radical, and in the preferred embodiment of the subject invention, each of these compounds include up to 20 carbon atoms in the alkyl radical. In this embodiment, the first ethylenically unsaturated monomer is more preferably selected from the group consisting of carbonate-modified glycidyl acrylate, carbonate-modified glycidyl methacrylate, and mixtures thereof. In the most preferred embodiment where the functional group of the first ethylenically unsaturated monomer is the carbamate functional group, the first ethylenically unsaturated monomer is carbonate-modified glycidyl methacrylate.

The carbonate functional group in the first block is preferably modified, i.e., converted, into the carbamate functional group after the first block is polymerized with the first block. More specifically, at a temperature between 50° C. and 100° C., more preferably between 50° C. and 70° C., the ammonia-containing, $NH_3$, compound is reacted with the carbonate functional group to convert the carbonate functional group into the carbamate functional group. This reaction step, between the ammonia-containing compound and the carbonate functional group, is conducted over time from 1 to 4 hours.

As described above, the ammonia-containing compound is selected from the group consisting of ammonia, ammonium hydroxide, and mixtures thereof. As understood by those skilled in the art, use of either ammonia or ammonium hydroxide to convert the carbonate functional group results in a primary carbamate functional of the general formula $NH_2COO$—. Additionally, a primary amine can be used to convert the carbonate functional group. Use of the primary amine results in a secondary carbamate functional group of the general formula $NHRCOO$—, where R is an alkyl radical. Although in the preferred embodiment the carbonate functional group is converted into the carbamate functional group after the first block is polymerized with the first block, it is to be understood that, alternatively, the carbonate functional group can be converted into the carbamate functional group prior to polymerization of the second block with the first block.

As described above, in the preferred embodiment, ammonium hydroxide is utilized to convert the carbonate functional group into the carbamate functional group. The ammonia, $NH_3$, group of the ammonium hydroxide can form a primary carbamate functional group having a primary hydroxyl (—OH) group which is shown schematically below.

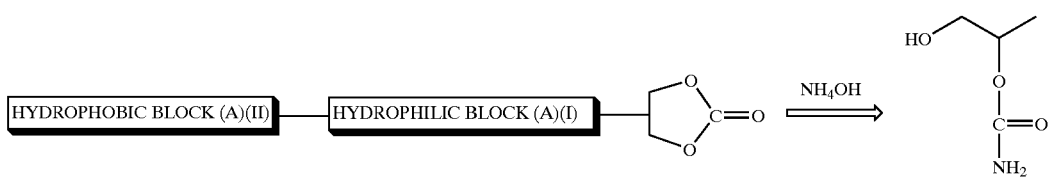

Alternatively, the ammonia, $NH_3$, group of the ammonium hydroxide can form a primary carbamate functional group having a secondary hydroxyl (—OH) group which is shown schematically below.

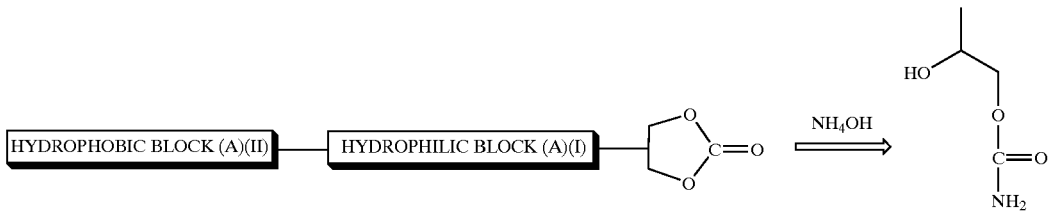

If the functional group of the first ethylenically unsaturated monomer is a hydroxyl functional group, then the first ethylenically unsaturated monomer is selected from the group consisting of aliphatic acrylates, aliphatic methacrylates, and mixtures thereof. It is to be understood that each of the aliphatic acrylate and methacrylate compounds include an alkyl radical, and in the preferred embodiment of the subject invention, each of these compounds include up to 20 carbon atoms in the alkyl radical. In this embodiment, the first ethylenically unsaturated monomer is more preferably selected from the group consisting of hydroxymethyl acrylate, hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, and mixtures thereof. In the most preferred embodiment where the functional group of the first ethylenically unsaturated monomer is the hydroxyl functional group, the first ethylenically unsaturated monomer is hydroxyethyl methacrylate.

If present in the plurality, the second ethylenically unsaturated monomer is preferably methyl methacrylate to optimize the physical properties described herein. Of course, depending on the physical properties desired, the second ethylenically unsaturated monomer could be another monomer including, but not limited to, an aliphatic acrylate, an aliphatic methacrylate, a cycloaliphatic acrylate, or a cycloaliphatic methacrylate.

Also, in the first block, at least one monomer of the plurality of ethylenically unsaturated monomers is present in an amount such that it can render the water-based copolymer water dispersible. It is possible that the presence of the functional group that can react with a water-dispersible cross-linking agent in the reaction product of the first block may also allow the copolymer to be water soluble. Additionally, the water solubility can be increased by including other hydroxy functional materials, hydroxy carbamate materials, polyethers and polyamines. When the monomer with the functional group that makes the copolymer water-dispersible is present in a sufficient amount, the copolymer is water soluble without the need to include structures in the first block that need to be converted to salts with a neutralizing agent to make the copolymer water soluble. Preferably, the monomer with the functional group that makes the copolymer water-dispersible is present in the first block in an amount that is at least about 30% by weight based on solids. More preferably, the monomer with the functional group that makes the copolymer water-dispersable is present in the first block in an amount from about 40 to about 80, and most preferably between 50–70% by weight based on solids.

By eliminating the salt structures in the copolymer formed from neutralizing agents, properties, such as humidity sensitivity and chalking, of a coating formed from the coating composition can be improved. Also, if the salt was an ammonia salt, the absence of the ammonia from the composition will lead to lower pop, pin holes, and better depth of image (DOI) because ammonia will not be volatized during baking conditions. Also, the compatibility of the clearcoat with the basecoat will be enhanced, which will minimize craters, haziness, and exudation.

The vinylaromatic hydrocarbon monomer of the first block is selected from the group consisting of α-methylstyrene, diphenylethylene, dinapthaleneethylene, and mixtures thereof. Further, it is to be understood that other α-alkylstyrenes may be selected as the vinylaromatic hydrocarbon monomer as well as other equivalent compounds including, but not limited to, cis- or trans-stilbene, vinylidenebis (4-N,N-dimethylaminobenzene), vinylidenebis (4-aminobenzene), or vinylidenebis (4-nitrobenzene). Although more than one vinylaromatic hydrocarbon monomer may be included in the first block, the preferred embodiment of the subject invention includes only one vinylaromatic hydrocarbon monomer, most preferably diphenylethylene. In terms of the total monomer composition in the first block of the copolymer, the vinylaromatic hydrocarbon monomer forms from 1 to 20, preferably from 3 to 7, parts by weight based on 100 parts by weight of total monomer composition in the first block.

In certain embodiments, the vinylaromatic hydrocarbon monomer of the first block may alternatively be defined as the at least one ethylenically unsaturated monomer that is different than the other ethylenically unsaturated monomers included in the plurality and that is of the general formula.

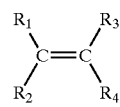

In these embodiments, the radicals $R_1$, $R_2$, $R_3$, and $R_4$, each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R_1$, $R_2$, $R_3$, and $R_4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl, or 2-ethylhexyl.

Examples of suitable cycloalkyl radicals are cyclobutyl, cyclopentyl, or cyclohexyl.

Examples of suitable alkylcycloalkyl radicals are methylenecyclohexane, ethylenecyclohexane, or propane 1,3-diylcyclohexane.

Examples of suitable cycloalkylalkyl radicals are 2-, 3-, or 4-methyl-, -ethyl-, -propyl-, or -butylcyclohex-1-yl.

Examples of suitable aryl radicals are phenyl, naphthyl or biphenylyl, preferably phenyl and naphthyl, and especially phenyl.

Examples of suitable alkylaryl radicals are benzyl or ethylene- or propane-1,3-diylbenzene.

Examples of suitable cycloalkylaryl radicals are 2-, 3-, or 4-phenylcyclohex-1-yl.

Examples of suitable arylalkyl radicals are 2-, 3-, or 4-methyl-, -ethyl-, -propyl-, or -butylphen-1-yl.

Examples of suitable arylcycloalkyl radicals are 2-, 3-, or 4-cyclohexylphen-1-yl.

The above-described radicals $R_1$, $R_2$, $R_3$, and $R_4$ may be substituted. The substituents used may comprise electron-withdrawing or electron-donating atoms or organic radicals. Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N,-dicyclohexylamino, N-cyclo-hexyl-N-methylamino and N-ethyl-N-methyl amino.

Examples of ethylenically unsaturated monomers whose use is particularly preferred in these embodiments are diphenylethylene, dinaphthaleneethylene, cis- or trans-stilbene, vinylidenebis (4-N,N-dimethylamino-benzene), vinylidenebis (4-aminobenzene), and vinylidenebis (4-nitrobenzene).

Also, in accordance with these embodiments, the at least one ethylenically unsaturated monomer may be used individually or as a mixture of at least two monomers.

Finally, as with the preferred embodiment which includes the vinylaromatic hydrocarbon monomer, the preferred ethylenically unsaturated monomer, different than the other ethylenically unsaturated monomers included in the plurality, in these alternative embodiments is diphenylethylene.

The initiator, also known a polymerization promoter, is added to the plurality of ethylenically unsaturated monomers and to the vinylaromatic hydrocarbon monomer to form the first block of the water-based copolymer. The initiator initiates the free-radical polymerization process. The initiator is soluble in water and is selected from the group consisting of inorganic persulfates, dialkyl peroxides, hydroperoxides, peresters, and mixtures thereof. In the preferred embodiment of the subject invention, the initiator is an inorganic persulfate selected from the group consisting of ammonium persulfate, $(NH_4)_2S_2O_8$, potassium persulfate, $K_2S_2O_8$, and sodium persulfate, $Na_2S_2O_8$. Most preferably, the initiator in ammonium persulfate. However, in alternative embodiments, the free-radical polymerization initiator may be a dialkyl peroxides such as di-tert-butyl peroxide or dicumyl peroxide, a hydroperoxide such as cumene hydroperoxide or tert-butyl hydroperoxide, or a perester, such as tert-butyl perbenzoate, tert-butyl perpivalate, tert-butyl per-3,4,5,-trimethylhexanoate or tert-butyl per-2-ethylhexanoate.

The weight ratio of the initiator to the vinylaromatic hydrocarbon monomer is preferably from 1:3 to 3:1. It is to be understood that it is preferred to add comparatively large amounts of the initiator. More specifically, it is preferred that the initiator be present in an amount from 0.5 to 50, more preferably from 1.0 to 20, and most preferably from 3 to 10, parts by weight based on 100 parts by weight of total monomer composition in the first block. At the completion of the formation of the first block, the first block has a non-volatile content of from 20 to 40, preferably from 30 to 35, percent non-volatile by weight. Furthermore, the completed first block has a weight average molecular weight, $M_W$, from 1,000 to 20,000, preferably from 2,000 to 8,000.

In terms of the three most preferred functional groups of carbonate, carbonate modified into carbamate, and hydroxyl functional groups, the plurality of ethylenically unsaturated monomers are selected from the group of compounds consisting of aliphatic acrylates, aliphatic methacrylates, cycloaliphatic acrylates, cycloaliphatic methacrylates, alkyl acrylic acids, and mixtures thereof, each of said compounds having up to 20 carbon atoms in the alkyl radical.

More specifically, the aliphatic acrylates are selected from the group consisting of alkyl acrylates, hydroxyalkyl acrylates, and mixtures thereof. The alkyl acrylates are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof. The hydroxyalkyl acrylates are of the general formula $R—OC(O)C(H):CH_2$, wherein R is an alkyl radical having from 1 to 6 carbon atoms and at least one hydroxyl group. Preferably, the hydroxyalkyl acrylates are selected from the group consisting of hydroxymethyl acrylate, hydroxyethyl acrylate, hydroxypropyl acrylate, hydroxybutyl acrylate, and mixtures thereof. If a hydroxyalkyl acrylate is selected, the most preferred hydroxyalkyl acrylate is hydroxyethyl acrylate.

The aliphatic methacrylates are selected from the group consisting of alkyl methacrylates, hydroxyalkyl methacrylates, and mixtures thereof. The alkyl methacrylates are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof. The hydroxyalkyl methacrylates are of the general formula $R—OC(O)C(CH_3):CH_2$, wherein R is an alkyl radical having from 1 to 6 carbon atoms and at least one hydroxyl group. Preferably, the hydroxyalkyl methacrylates are selected from the group consisting of hydroxymethyl methacrylate, hydroxyethyl methacrylate, hydroxypropyl methacrylate, hydroxybutyl methacrylate, and mixtures thereof. If a hydroxyalkyl methacrylate is selected, the most preferred hydroxyalkyl methacrylate is hydroxyethyl methacrylate.

The cycloaliphatic acrylates are selected from the group consisting of cyclohexyl acrylate, glycidyl acrylate, carbonate-modified glycidyl acrylate, and mixtures thereof. Similarly, the cycloaliphatic methacrylates are selected from the group consisting of cyclohexyl methacrylate, glycidyl methacrylate, carbonate-modified glycidyl methacrylate, and mixtures thereof. Of course, it is to be understood that, if the functional group of the first block is either the carbonate or the carbamate functional group, then it is necessary that at least the carbonate-modified glycidyl acrylate or carbonate-modified glycidyl methacrylate is selected so as to provide the necessary functional group.

Next, the second block having the at least one ethylenically unsaturated monomer, which will be described in detail below, is polymerized with the first block to establish the water-based copolymer. This polymerization step, between the monomer or monomers making up the second block and the first block, is conducted over time from 1 to 8, preferably from 5 to 6, hours, and at a temperature between 50° C. and 100° C., more preferably between 70° C. and 90° C. As with the polymerization step for forming the first block, it is to be understood that the time required to conduct this 'polymerization step' includes the time needed for the addition of monomer components as well as any holding or cooling time, where the addition of monomers may not be occurring. Also, for this polymerization step, preferably no additional free-radical initiator is required. Instead, this polymerization step is preferably initiated by self-formation of radicals. Also, in this polymerization step, the vinylaromatic hydrocarbon monomer of the first block, in the preferred embodiment diphenylethylene, controls the polymerization of the incoming monomer or monomers that make up the second block. This is a case of a "living polymerization" controlled by scission and recombination of a diphenylmethyl group from the growing polymer chain.

Although the second block of the copolymer is described herein in terms of a single non-functional, ethylenically unsaturated monomer, there is preferably more than one ethylenically unsaturated monomer, wherein at least a portion of which are non-functional, in the preferred embodiment in order to further balance the physical properties described herein. Either individually, or in combination, the at least one ethylenically unsaturated monomer is present in an amount from 20 to 80, preferably from 30 to 40, parts by weight based on 100 parts by weight of the coating composition. The at least one ethylenically unsaturated monomer is further defined as an alkyl compound having from 2 to 20 carbon atoms in the alkyl radical and preferably having no functional groups suitable for reaction with the cross-linking agent. In the context of the subject invention, the terminology of having no functional groups suitable for reaction with the cross-linking agent is intended to indicate that the monomers selected for the second block of the copolymer do not include a carbonate, carbamate, or hydroxyl functional group, or other equivalent functional groups. In cases where such functional groups are desired in the second block, they are preferably kept to <20% of the total weight of monomers.

Preferred non-functional, ethylenically unsaturated monomers are selected from the group consisting of styrene, methyl acrylate, methyl methacrylate, butyl acrylate, butyl methacrylate, 2-ethylhexyl acrylate, 2-ethylhexyl methacrylate, cyclohexyl acrylate, cyclohexyl methacrylate, glycidyl acrylate, glycidyl methacrylate, and mixtures thereof. More preferably, the non-functional, ethylenically unsaturated monomer is selected from the group consisting of styrene, butyl methacrylate, 2-ethylhexyl methacrylate, and mixtures thereof. In the most preferred embodiment of the subject invention, there are three non-functional, ethylenically unsaturated monomers selected, specifically, styrene, butyl methacrylate, and 2-ethylhexyl methacrylate. It is to be understood that other monomers suitable as the non-functional, ethylenically unsaturated monomer in the second block include, but are not limited to, all monomers described above such as the aliphatic acrylates and methacrylates (e.g. methyl acrylate, etc.) so long as the monomer does not include a functional group (or preferably kept below 20%) suitable for reaction with the cross-linking agent.

Preferably, the non-functional, ethylenically unsaturated monomer or monomers are hydrophobic, i.e., insoluble in water, and in preparing the second block of the copolymer, the non-functional, ethylenically unsaturated monomer or monomers are selected to promote miscibility between the coating composition and other components commonly utilized in WBBC, WBCC, and waterborne primer systems. The non-functional, ethylenically unsaturated monomer or monomers are also selected to contribute to the MFFT for the water-based copolymer, and ultimately for the cured film of the water-based coating composition utilized in either the WBBC, WBCC, or waterborne primer systems. Furthermore, the completed second block has a weight average molecular weight, $M_w$, from 500,000 to 5,000,000, preferably about 1,000,000 to 2,000,000, and is a true emulsion as understood by those skilled in the art.

As described above, the water-based coating composition is also the reaction product of the water-dispersible cross-linking agent. The water-based copolymer is combined with the water-dispersible cross-linking linking to prepare the water-based coating composition. Generally, the water-dispersible cross-linking agent is selected from the group consisting of water-dispersible aminoplasts, water-dispersible polymers having an acrylamide group, water-dispersible polymers having a methylol or alkoxymethyl group, water-soluble $C_2$ to $C_{20}$ alkyl compounds having an amino functional group, and mixtures thereof. It would be ideal for mixtures of the cross-linking agents listed above to be present if there is more than one particular type of functional group present in the first block. That is, more than one cross-linking agent is also contemplated to be within the scope of the subject invention. The cross-linking agent is present in an amount from 0.1 to 15, preferably from 2 to 6, parts by weight based on 100 parts by weight of the coating composition. However, the particular water-dispersible cross-linking agent selected is preferably determined by the type or types of functional groups present in the first block.

In an embodiment where the functional group in the first block of the copolymer is the carbonate functional group, the water-dispersible cross-linking agent is further defined as a water-soluble $C_2$ to $C_{20}$ alkyl compound having an amino functional group, $NH_2$, reactive with the carbonate functional group. It is to be understood that water-soluble is intended to indicate that approximately 0.25 grams of cross-linking agent or more can dissolve for every 100 ml of water. The water-based copolymer is combined with the cross-linking agent to form the coating composition of the subject invention. When the carbonate functional group is present, the cross-linking agent is preferably a low cost, low molecular weight di-, tri-, or other poly-amine. More specifically, the water-soluble $C_2$ to $C_{20}$ alkyl compounds that have at least one amino functional group include, but not limited to, hexamethylenediamine, triaminononane, and mixtures thereof. The most preferred cross-linking agent with the carbonate functional group is triaminononane, having three amino functional groups. For descriptive purposes, triaminononane is the common chemical name, and 4-aminomethyl-1,8-octanediamine is the accepted chemical abstract chemical name.

Upon addition of the cross-linking agent to the copolymer, the amino functional group of the cross-linking agent reacts with the carbonate functional group in the first block of the copolymer. In terms of the preferred embodiment, the first block of the copolymer includes carbonate-modified glycidyl methacrylate as a monomer component as disclosed in the following chemical representation.

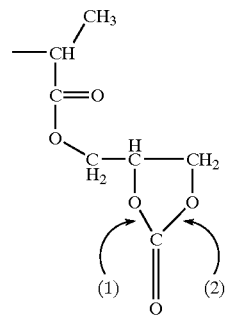

As shown schematically in the above chemical representation of the carbonate-modified glycidyl methacrylate of the preferred embodiment, the amino functional groups, $NH_2$, of the triaminononane react at either (1) or (2) to open the ring and result either in a primary or secondary urethane (—NH—CO—O—) linkage. The resulting primary and secondary urethane linkages established in the coating com position of the subject invention are shown respectively in the following chemical representations.

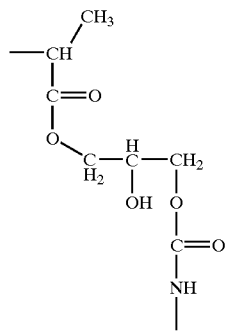

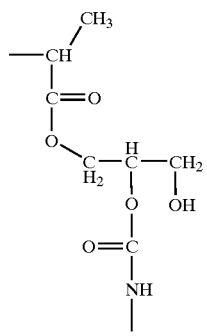

The resulting carbonate-amine cross-linking that establishes either urethane linkages shown above is ideal for resistance to environmental acid etch.

In an embodiment where the functional group in the first block of the copolymer is the carbamate functional group, the water-dispersible cross-linking agent is further defined as a water-dispersible aminoplast that is reactive with the carbamate functional group. The aminoplast is dispersible in water. For all components of the subject invention, it is to be understood that dispersibility in water indicates that the component can be mixed into water to produce a homogenous mixture of the component and the water with no phase separation between the two components. In the context of the cross-linking agent, the cross-linking agent can be mixed into water to produce a homogeneous mixture of the cross-linking agent and the water with no phase separation between the two components. The water-based copolymer is combined with the cross-linking agent to form the coating composition of the subject invention. More specifically, small amounts, from 0.1 to 5 parts by weight based on 100 parts by weight of the total coating composition, of an anionic surfactant may be added with the copolymer and the cross-linking agent to guarantee the dispersibility of the cross-linking agent in water. Preferably, a sulfonate-based surfactant is selected as the anionic surfactant.

In this embodiment, where the functional group in the first block of the copolymer is the carbamate functional group, the cross-linking agent is selected from the group consisting of water-dispersible aminoplasts, water-dispersible polymers having acrylamide groups, and water-dispersible polymers having methylol or alkoxymethyl groups, and mixtures thereof. It is to be understood that the water-dispersible aminoplasts include urea resins and melamine formaldehyde resins. The melamine formaldehyde resins of the preferred embodiment include either a methylol group, $CH_2OH$, an alkoxymethyl group, or both. The alkoxymethyl group is of the general formula —$CH_2OR_1$, where $R_1$ is an alkyl chain having from 1 to 20 carbon atoms. As understood by those skilled in the art, the methylol groups and the alkoxymethyl groups are reactive with the carbamate functional group.

Possible cross-linking agents include, but are not limited to, monomeric and polymeric melamine formaldehyde resins, including both partially and fully alkylated melamines such as methylated melamines, butylated melamines, and methylated/butylated melamines. Other cross-linking agents that are urea resins include methylol ureas such as urea formaldehyde resins, and alkoxy ureas such as butylated urea formaldehyde resin.

The preferred embodiment of the subject invention includes hexamethoxymethyl melamine (HMMM). HMMM is commercially available from Monsanto under its Resimene Amino Crosslinker Resins. HMMM is shown in the following chemical representation.

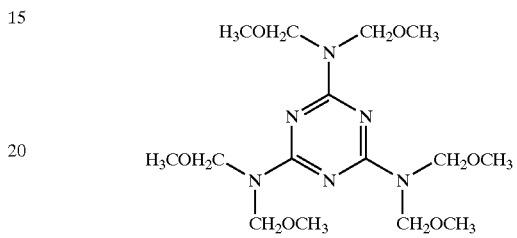

Upon addition of the cross-linking agent to the copolymer, the alkoxymethyl groups of the HMMM, specifically the $CH_2OCH_3$ group, reacts with the carbamate functional group in the first block of the copolymer to establish a urethane (—NH—CO—O—) linkage without use of an isocyanate. The urethane linkage between the copolymer and the cross-linking agent is from the carbamate-melamine reaction and is ideal for resistance to environmental acid etch.

In an embodiment where the functional group in the first block of the copolymer is the hydroxyl functional group, the water-dispersible cross-linking agent is defined as above for the embodiment where the functional group is the carbamate functional group. That is, in this embodiment, the water-dispersible cross-linking agent is further defined as a water-dispersible aminoplast that is reactive with the hydroxyl functional group. The water-based copolymer is combined with the cross-linking agent to form the coating composition of the subject invention. More specifically, small amounts, from 0.1 to 5 parts by weight based on 100 parts by weight of the total coating composition, of an anionic surfactant may be added with the copolymer and the cross-linking agent to guarantee the dispersibility of the cross-linking agent in water. Preferably, a sulfonate-based surfactant is selected as the anionic surfactant.

In this embodiment, where the functional group in the first block of the copolymer is the hydroxyl functional group, the cross-linking agent is selected from the group consisting of water-dispersible aminoplasts, water-dispersible polymers having acrylamide groups, and water-dispersible polymers having methylol or alkoxymethyl groups, and mixtures thereof. It is to be understood that the water-dispersible aminoplasts include urea resins and melamine formaldehyde resins. The melamine formaldehyde resins of the preferred embodiment include either a methylol group, $CH_2OH$, an alkoxymethyl group, or both. The alkoxymethyl group is of the general formula —$CH_2OR_1$, where $R_1$ is an alkyl chain having from 1 to 20 carbon atoms. As understood by those skilled in the art, the methylol groups and the alkoxymethyl groups are reactive with the hydroxyl functional group.

Possible cross-linking agents include, but are not limited to, monomeric and polymeric melamine formaldehyde resins, including both partially and fully alkylated melamines such as methylated melamines, butylated melamines, and methylated/butylated melamines. Other cross-linking agents that are urea resins include methylol ureas such as urea formaldehyde resins, and alkoxy ureas such as butylated urea formaldehyde resin. The preferred embodiment of the subject invention includes hexamethoxymethyl melamine (HMMM).

Upon addition of the cross-linking agent to the copolymer, the alkoxymethyl groups of the HMMM, specifically the —OCH$_3$ of the CH$_2$OCH$_3$ group, reacts with the hydrogen atom of the hydroxyl functional group in the first block of the copolymer thereby forming methanol. The cross-linking forms O—CH$_2$—O ether linkages. The amount of crosslinking is generally small due to the already very high molecular weight of the resin. This crosslinked resin should show high resistance to environmental etch.

If the third block is present in the copolymer, then the third block is preferably a functional block. As a functional block, the third block would also include monomers introducing the functional groups, such as 2-hydroxyethyl methacrylate for introducing the hydroxyl functional group. In such an embodiment, the third block of the copolymer would also participate in reacting with the cross-linking agent. Of course, it is to be understood that the third block may also be a non-functional block without limiting the scope of the subject invention.

Overall, the copolymer has a weight-average molecular weight, $M_w$, of from 5,000 to 5,000,000. Additionally, the coating composition of the subject invention has a non-volatile content of from 20 to 80, preferably from 30 to 60, percent non-volatile by weight, and an average volume particle size less than or equal to 200 nm.

As indicated above, the water-based coating composition of the subject invention can be used to form cured films in waterborne basecoat systems, waterborne clearcoat systems, and waterborne primer systems. However, for descriptive purposes only, the subject invention will be described in terms of the cured film in a waterborne primer system. The cured film of the water-based coating composition of the subject invention is prepared by applying the water-based coating composition to the substrate. It is to be understood that the substrate may already have other coatings applied to it, such as an electro-deposited coating. The water-based coating composition can be sprayed onto the substrate by air-atomized or bell-applied spray application, and other equivalent processes. Once applied to the substrate, the coating composition is cured to form the cured film. Although cross-linking may occur prior to the curing step, the functional group of the first block and the cross-linking agent completely react during the curing step to form the cured film of the water-based coating composition including the urethane cross-linking. Preferably, the reaction between the functional group of the first block and the cross-linking agent occurs at a temperature between 100° C. and 175° C., and more preferably at a temperature between 110° C. and 130° C. from 20 to 30 minutes. As described below with respect to the layered-paint system, a colored basecoat composition and a clearcoat composition are preferably applied prior to the curing of the water-based coating composition, functioning as a waterborne primer system, to form the cured film.

The subject invention also includes a layered-paint system utilizing the water-based coating composition. This layered-paint system is applied to the substrate in a wet-on-wet-on-wet process. More specifically, a first layer is applied onto the substrate. The first layer includes the reaction product of the water-dispersible cross-linking agent and the water-based copolymer as described above with respect to the water-based coating composition. In this embodiment of the subject invention, the first layer operates as a waterborne primer system and is preferably applied to the substrate which already has the electro-deposited coating applied to it.

A second layer, including the colored basecoat composition compatible with the first layer, is then applied onto the first layer. Examples of colored basecoat compositions that are compatible with the first layer, i.e., with the water-based coating composition of the subject invention, are codes E55NW038, E172KE170, and E174YE245. E55NW038 is an Autumn Wood Metallic solventborne basecoat. E172KE170 is a Low Gloss Black solventborne basecoat, and E174YE245 is a Cleveland Yellow waterborne basecoat, which are all commercially available from BASF Corporation, Southfield, Mich. The second layer is applied to the first layer as the first layer is wet. That is, the second layer is applied to the first layer without cure of the first layer. However, it is to be understood that a suitable flash period, possibly even including a pre-cure at a slightly elevated temperature, may be incorporated prior to application of the second layer. Colored basecoat compositions compatible with the first layer include, but are not limited to, waterborne basecoat systems and solventborne basecoat systems including polyester, acrylic, epoxy, and polyurethane-based solventborne basecoat systems.

A third layer, including the clearcoat composition compatible with the second layer, is then applied onto the second layer. Examples of clearcoat compositions that are compatible with the second layer, i.e., with the colored basecoat compositions, are codes E126CD020, E04CE002, E176CD051. E126CD020 is Stainguard 6 solventborne clearcoat, E04CE002 is High-Solids solventborne clearcoat, and E176CD051 is Tinted Low Bake solventborne clearcoat, which are all commercially available from BASF Corporation, Southfield, Mich. The third layer is applied to the second layer as the second layer is wet. That is, the third layer is applied to the second layer without cure of the second layer. However, it is to be understood that a suitable flash period, possibly even including a pre-cure at a slightly elevated temperature, may be incorporated prior to application of the third layer. Clearcoat compositions compatible with the second layer include, but are not limited to, waterborne clearcoat systems and solventborne clearcoat systems including polyester, acrylic, epoxy, polyurethane-, and silane-based solventborne clearcoat systems.

It is to be understood that all of the preceding chemical representations are merely two-dimensional chemical representations and that the structure of these chemical representations may be other than as indicated.

The invention is further described in the following examples. The examples are merely illustrative and do not in any way limit the scope of the invention as described and claimed.

EXAMPLE 1

350.4 g of distilled water were added to a reactor and heated to 80° C. A first mixture was prepared by mixing 175.4 of glycidyl methacrylate carbonate, 122.6 g methyl methacrylate, and 10 g of α,α-diphenyl ethylene. A second mixture was prepared from 64.1 g of ammonium hydroxide (25% solution), 35 g of distilled water, and 15 g of ammonium persulfate. At zero time, the addition of the first mixture was started into the reactor. After 5 minutes, the second mixture was started. Any foaming that was generated was controlled by cooling to 70° C. and making a dilution of the reaction mixture (with about 50 g water and 20 g of 25% ammonium hydroxide). After completion of the additions of first and second mixtures in about 6:30 hours, 200 g of water was added. The reaction product had a non-volatile content of 29.5%. Theoretical solids 31%. IR confirmed that all the carbonate groups had been converted to carbamate groups.

90 g of the above reaction product and 500 g of distilled water were added to a reactor and heated to 90° C. A mixture was prepared from 138.8 g butyl methacrylate, 79 g styrene, 80 g hydroxyethyl methacrylate, and 175 g ethylhexyl methacrylate. The monomer mixture was metered into the reactor in 6:20–7 hours. After the addition, 200 g of distilled water were added to the reactor and held for three more hours at 98° C. Completion of the reaction was measured by checking for the amounts of monomers by gas chromatography (GC) and by measuring the solids. After 3 hrs, GC showed that more than 95% of the monomers had been converted, but the resin was skinning fast resulting in lower measured solids in the solution. About 20 ml of ammonium persulfate solution (1%) were added to convert remaining monomers.

The reaction product was filtered and drawn down on a glass plate. A clear, hard film was formed after 6 minutes at room temperature. The film was subjected to double rubs with methyl ethyl ketone according to ASTM D5402. The film was able to last for 5 rubs, showing that it does not have durability.

14 g of the reaction product, 10 g of water, and 1 g of melamine crosslinker were mixed. The composition had a bluish white tint. The composition was drawn down on a glass plate and allowed to air dry at room temperature. The film was then cured at 110° C. (230° F.) for 30 minutes. The film was subjected to double rubs with methyl ethyl ketone. The film was able to last for more than 100 double rubs.

EXAMPLE 2

350.4 g of distilled water were added to a reactor and heated to 80° C. A first mixture was prepared by mixing 150 g of 2-hydroxyethylmethacrylate (HEMA), 122.6 g methyl methacrylate, 144 g of n-butylmethacrylate, and 10 g of α,α-diphenyl ethylene. A second mixture was prepared from 35 g of distilled water and 15 g of ammonium persulfate. At zero time, the addition of the first mixture was started into the reactor. After 5 minutes, the second mixture was started. After completion of the additions of first and second mixtures in about 6:30 hours, 300 g of water was added. The reaction product had a non-volatile content of 39.5%. Theoretical solids 39.6%.

90 g of the above reaction product and 500 g of distilled water were added to a reactor and heated to 90° C. A mixture was prepared from 138.8 g butyl methacrylate, 79 g styrene, 80 g hydroxyethyl methacrylate, and 175 g ethylhexyl methacrylate. The monomer mixture was metered into the reactor in 6:20–7 hours. After the addition, 200 g of distilled water were added to the reactor and held for three more hours at 90° C. Completion of the reaction was measured by checking for the amounts of monomers by gas chromatography (GC) and by measuring the solids. After 3 hrs, GC showed that more than 95% of the monomers have been converted, but the resin was skinning fast resulting in lower measured solids in the solution. About 20 ml of ammonium persulfate solution (1%) was added to convert remaining monomers.

The reaction product was filtered and drawn down on a glass plate. A clear, hard film was formed after 6 minutes at room temperature. The film was subjected to double rubs with methyl ethyl ketone (ASTM D5402). The film was able to last for 5 rubs, showing that it does not have durability.

14 g of the reaction product, 10 g of water, and 1 g of melamine crosslinker were mixed. The composition had a bluish white tint. The composition was drawn down on a glass plate and allowed to air dry at room temperature. The film was then cured at 110° C. (230° F.) for 30 minutes. The film was subjected to double rubs with methyl ethyl ketone. The film was able to last for more than 150 double rubs.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A curable, water-based coating composition comprising a reaction product of:
   A. a copolymer comprising a free-radical polymerization product of:
      i. a first block comprising a reaction product of:
         a. a plurality of ethylenically unsaturated monomers, and
         b. a vinyl aromatic hydrocarbon monomer,
         wherein at least one monomer of the plurality of ethylenically unsaturated monomers includes a functional group that can react with a water-dispersible cross-linking agent, and at least one monomer of the plurality of ethylenically unsaturated monomers is present in an amount such that it can render the copolymer water dispersible, and
      ii. a second block comprising a reaction product of at least one ethylenically unsaturated monomer, wherein at least a portion of which are non-functional, and
   B. a water-dispersible cross-linking agent, and
   wherein the copolymer is free of salt structures.

2. The coating composition of claim 1, wherein the monomer that includes the functional group that makes the copolymer water-dispersible is present in the first block in an amount that is at least about 30% by weight based on solids.

3. The coating composition of claim 1, wherein the monomer that includes the functional group that makes the copolymer water-dispersible is present in the first block in an amount from about 40 to about 80% by weight based on solids.

4. The coating composition of claim 1, wherein the functional group that can react with the cross-linking agent is selected from the group consisting of carbonate functional groups, hydroxyl functional groups, and mixtures thereof.

5. The coating composition of claim 1, wherein the functional group that can react with the cross-linking agent is a carbonate functional group.

6. The coating composition of claim 5, wherein the carbonate functional group that can react with the cross-linking agent is modified into a carbamate functional group.

7. The coating composition of claim 6 further comprising a reaction product of an ammonia-containing compound reactive with the monomer of the plurality for modifying the carbonate functional group into the carbamate functional group.

8. The coating composition of claim 7, wherein the ammonia-containing compound is selected from the group consisting of ammonia, ammonium hydroxide, and mixtures thereof.

9. The coating composition of claim 1, wherein the functional group that can react with the cross-linking agent is a hydroxyl functional group.

10. The coating composition of claim 1, wherein the monomer that includes the functional group that can react with the cross-linking agent is present in the first block in an amount that is at least about 30% by weight based on solids.

11. The coating composition of claim 1, wherein the monomer that includes the functional group that can react with the cross-linking agent is present in the first block in an amount from about 40 to about 80% by weight based on solids.

12. The coating composition of claim 1, wherein the plurality of ethylenically unsaturated monomers are selected from the group consisting of aliphatic acrylates, aliphatic methacrylates, cycloaliphatic acrylates, cycloaliphatic methacrylates, alkyl acrylic acids, and mixtures thereof, each of the compounds having up to 20 carbon atoms in the alkyl radical.

13. The coating composition of claim 12, wherein the aliphatic acrylates are selected from the group consisting of alkyl acrylates, hydroxyalkyl acrylates, and mixtures thereof.

14. The coating composition of claim 13, wherein the alkyl acrylates are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof.

15. The coating composition of claim 13, wherein the hydroxyalkyl acrylates are of the general formula R—OC(O)C(H):CH$_2$, wherein R is an alkyl radical having from 1 to 6 carbon atoms and at least one hydroxyl group.

16. The coating composition of claim 13, wherein the hydroxyalkyl acrylates are selected from the group consisting of hydroxymethyl acrylate, hydroxyethyl acrylate, hydroxypropyl acrylate, hydroxybutyl acrylate, and mixtures thereof.

17. The coating composition of claim 12, wherein the aliphatic methacrylates are selected from the group consisting of alkyl methacrylates, hydroxyalkyl methacrylates, and mixtures thereof.

18. The coating composition of claim 17, wherein the alkyl methacrylates are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof.

19. The coating composition of claim 18, wherein the hydroxyalkyl methacrylates are of the general formula R—OC(O)C(CH$_3$):CH$_2$, wherein R is an alkyl radical having from 1 to 6 carbon atoms and at least one hydroxyl group.

20. The coating composition of claim 17, wherein the hydroxyalkyl methacrylates are selected from the group consisting of hydroxymethyl methacrylate, hydroxyethyl methacrylate, hydroxypropyl methacrylate, hydroxybutyl methacrylate, and mixtures thereof.

21. The coating composition of claim 12, wherein the cycloaliphatic acrylates are selected from the group consisting of cyclohexyl acrylate, glycidyl acrylate, carbonate-modified glycidyl acrylate, and mixtures thereof.

22. The coating composition of claim 12, wherein the cycloaliphatic methacrylates are selected from the group consisting of cyclohexyl methacrylate, glycidyl methacrylate, carbonate-modified glycidyl methacrylate, and mixtures thereof.

23. The coating composition of claim 12, wherein the alkyl acrylic acids are selected from the group consisting of acrylic acid, methacrylic acid, ethacrylic acid, maleic acid, fumaric acid, itaconic acid, crotonic acid, and mixtures thereof.

24. The coating composition of claim 1, wherein the first block is present in an amount from 5 to 15 parts by weight based on 100 parts by weight of the coating composition.

25. The coating composition of claim 1, wherein the second block is present in an amount from 20 to 80 parts by weight based on 100 parts by weight of the coating composition.

26. The coating composition of claim 1, wherein the at least one vinylaromatic hydrocarbon monomer is selected from the group consisting of α-methylstyrene, diphenylethylene, dinapthaleneethylene, and mixtures thereof.

27. The coating composition of claim 1, wherein the at least one ethylenically unsaturated monomer in the second block is non-functional and comprises an alkyl compound having from 2 to 20 carbon atoms in the alkyl radical and having no functional groups that can react with the cross-linking agent.

28. The coating composition of claim 1, wherein the at least one ethylenically unsaturated monomer in the second block is non-functional and is selected from the group consisting of styrene, methyl acrylate, methyl methacrylate, butyl acrylate, butyl methacrylate, 2-ethylhexyl acrylate, 2-ethylhexyl methacrylate, cyclohexyl acrylate, cyclohexyl methacrylate, glycidyl acrylate, glycidyl methacrylate, and mixtures thereof.

29. The coating composition of claim 1, wherein the first block has a weight average molecular weight of from 1,000 to 20,000.

30. The coating composition of claim 1, wherein the coating composition has a non-volatile content of from 20 to 60 percent non-volatile by weight.

31. The coating composition of claim 1, wherein the coating composition has an average particle size of less than or equal to 200 nm.

32. The coating composition of claim 1, wherein the copolymer has a weight average molecular weight of from 5,000 to 5,000,000.

33. The coating composition of claim 1, wherein the copolymer's block structure is a result of controlled polymerization of the second block onto the first block by the influence of the vinyl aromatic hydrocarbon monomer.

34. The coating composition of claim 1, wherein the copolymer is water soluble.

35. The coating composition of claim 1, wherein the water-dispersible cross-linking agent is present in an amount from 0.1 to 15 parts by weight based on 100 parts by weight of the coating composition.

36. The coating composition of claim 1, wherein the water-dispersible cross-linking agent is selected from the group consisting of water-dispersible aminoplasts, water-dispersible polymers having an acrylamide group, water-dispersible polymers having a methylol or alkoxymethyl group, water-soluble $C_2$ to $C_{20}$ alkyl compounds having an amino functional group, and mixtures thereof.

37. The coating composition of claim 6, wherein the water-dispersible cross-linking agent comprises a water-dispersible aminoplast reactive with the carbamate functional group.

38. The coating composition of claim 37, wherein the water-dispersible aminoplast comprises a melamine formaldehyde resin having a methylol group, an alkoxymethyl group, or both, which are reactive with the carbamate functional group.

39. The coating composition of claim 1, wherein the water-based copolymer further comprises a reaction product of a third block, the third block comprising the at least one monomer of the plurality including the functional group that can react with the cross-linking agent.

40. The coating composition of claim 1, wherein the vinylaromatic hydrocarbon monomer is of the general formula

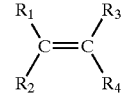

wherein the radicals each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R_1$, $R_2$, $R_3$, and $R_4$ are at least one of an unsubstituted aryl radical, an unsubstituted arylalkyl radical, an unsubstituted arylcycloalkyl radical, a substituted aryl radical, a substituted arylalkyl radical, or a substituted arylcycloalkyl radical.

41. A layered-paint system comprising:
  A. a first layer applied onto the substrate, wherein the first layer comprises a coating prepared from the coating composition of claim 1;
  B. a second layer applied onto the first layer, the second layer comprising a colored basecoat composition compatible with the first layer; and
  C. a third layer applied onto the second layer, the third layer comprising a clearcoat composition compatible with the second layer.

42. A method of preparing the curable, water-based coating composition of claim 1 comprising:
  A. forming a first block of a copolymer comprising polymerizing
    a. a plurality of ethylenically unsaturated monomers, and
    b. a vinyl aromatic hydrocarbon monomer,
  wherein at least one monomer of the plurality of ethylenically unsaturated monomers includes a functional group that can react with the cross-linking agent, and at least one monomer of the plurality of ethylenically unsaturated monomers is present in an amount such that it can render the copolymer water dispersible;
  B. polymerizing a second block, that includes at least one ethylenically unsaturated monomer, wherein at least a portion of which are non-functional, with the first block to establish the water-based copolymer; and
  C. combining the water-based copolymer with the water-dispersible cross-linking linking agent to prepare the water-based coating composition;
wherein no neutralizing agents are added to the composition to make the copolymer water soluble.

43. A method comprising:
  A. applying the water-based coating composition of claim 1 to a substrate; and
  B. curing the water-based coating composition to form a cured film.

* * * * *